R. WEIR.
Screw-Tap.
No. 218,845. Patented Aug. 26, 1879.
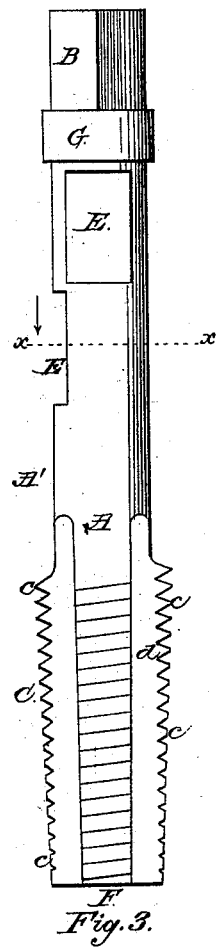
Fig. 1.
Fig. 3.
Fig. 2.
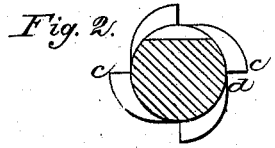
Attest:
F. H. Schott.
E. A. Dick
Inventor:
Robert Weir
By Newton Cranford
atty.

UNITED STATES PATENT OFFICE.

ROBERT WEIR, OF MUSKEGON, MICHIGAN.

IMPROVEMENT IN SCREW-TAPS.

Specification forming part of Letters Patent No. 218,845, dated August 26, 1879; application filed December 4, 1878.

*To all whom it may concern:*

Be it known that I, ROBERT WEIR, now a resident of Muskegon, in the county of Muskegon, in the State of Michigan, have made certain Improvements in Screw-Taps for cutting screw-threads in nuts and other places where a screw-bolt is to be turned, of which the following is a specification.

Blank nuts in which screw threads are to be cut in the center hole have the hole punched to a gage, and of such size that screw-taps of the same gage will exactly fit and cut the screw-thread in the hole; but there are many places in which a hole has to be drilled in order to have a screw-tap cut a screw-thread therein with safety. If the drilled hole is too small, the tap is liable to be broken in the attempt to cut the thread therein, or if too large, the screw-thread is imperfect, and will not hold when the screw-bolt is screwed home; and to have a ready means always at hand to determine the exact diameter of the drill that is to be used to drill the hole in which the screw-tap is to be used to cut a screw-thread is the object of this invention; and it consists in the construction of the screw-tap with a correct gage thereon which shows the diameter of the drill to be used to drill the hole, as will be fully hereinafter described.

In the drawings, Figure 1 is a side view, partly in section, of the tap. Fig. 2 is a cross-section at line $x\ x$, Fig. 1, and Fig. 3 is a top-end view.

A represents the screw-tap entire. A' represents the shank part, or that part of the tap above the screw-thread. C is the part of the tap having the screw-thread cutters, and $c$ represents the cutters having longitudinal grooves or recesses $d$ forward of the cutters, which form a throat or space for the reception of the shavings cut by the cutters $c$, and is the same as taps in general use for tapping nuts.

E is a space or spaces made in the shank of the tap, having the same length as the diameter of the drill should be to drill the hole in a nut or plate of the exact diameter that the small end F of the tap will enter and cut its way through the hole so drilled, without danger of breaking the tap by reason of the hole being too small, or an imperfect thread in the nut or plate because the drill-hole is too large, as the gages E will always be upon the tap to give the exact diameter of the hole to be drilled to fit the tap, and have a perfect screw-thread cut therein.

Other constructions of gages may be employed, such as having the gage between two depressions, or an enlarged part on shank A', as at G, which may be rectangular, and each side be the length of the diameter of the drill to be used, without departing from the spirit of my invention, or the gage may be in or upon an elongation of the body below the screw-threads or cutters on the tap.

Having thus described my invention, what I claim is—

The screw-tap A having a gage or gages, E, permanently made in or upon the body of the tap or upon shank A', as and for the purposes described.

ROBERT WEIR.

Witnesses:
HERMAN FAHRIG,
FRANK CREIGHTON.